(12) United States Patent
Takaishi et al.

(10) Patent No.: US 8,744,706 B2
(45) Date of Patent: Jun. 3, 2014

(54) LINE PRESSURE CONTROL DEVICE FOR AUTOMATIC TRANSMISSION

(75) Inventors: Toshihiko Takaishi, Wako (JP);
Hideyuki Yamanaka, Wako (JP);
Tomohisa Kaneda, Wako (JP)

(73) Assignee: Honda Motor Co., Ltd., Tokyo (JP)

(\*) Notice: Subject to any disclaimer, the term of this patent is extended or adjusted under 35 U.S.C. 154(b) by 26 days.

(21) Appl. No.: 13/001,756

(22) PCT Filed: May 19, 2009

(86) PCT No.: PCT/JP2009/059185
§ 371 (c)(1),
(2), (4) Date: Dec. 28, 2010

(87) PCT Pub. No.: WO2010/001665
PCT Pub. Date: Jan. 7, 2010

(65) Prior Publication Data
US 2011/0112735 A1    May 12, 2011

(30) Foreign Application Priority Data
Jul. 4, 2008   (JP) .................................. 2008-176213

(51) Int. Cl.
*G06F 19/00*   (2011.01)
*F16H 59/00*   (2006.01)

(52) U.S. Cl.
USPC ............................................. 701/56; 477/98

(58) Field of Classification Search
USPC ........... 701/51, 55, 56, 58; 477/70, 76, 97, 98
See application file for complete search history.

(56) References Cited

U.S. PATENT DOCUMENTS

| 5,079,973 A | * | 1/1992 | Ookubo et al. | 477/126 |
| 5,131,294 A | * | 7/1992 | Yoshimura | 477/109 |
| 5,261,295 A | * | 11/1993 | Iwanaga et al. | 477/98 |
| 5,393,275 A | * | 2/1995 | Okada et al. | 477/81 |
| 5,556,349 A | * | 9/1996 | Ishii et al. | 477/76 |
| 5,813,943 A | * | 9/1998 | Kousaka et al. | 477/156 |

(Continued)

FOREIGN PATENT DOCUMENTS

| JP | 2042266 A | | 2/1990 |
| JP | 6-15900 B2 | | 3/1994 |
| JP | 2002-089679 A | | 3/2002 |
| JP | WO2010/001665 | * | 1/2010 |

OTHER PUBLICATIONS

Chinese Office Action, dated Apr. 2, 2013, 15 pages.

*Primary Examiner* — Fadey Jabr
*Assistant Examiner* — Aaron L Troost
(74) *Attorney, Agent, or Firm* — Arent Fox LLP

(57) ABSTRACT

Mapped data of line pressure set to any of high pressure/low pressure regions on the basis of an engine load are stored in a storage section. A determining section 103 determines, on the basis of temperature of the hydraulic oil detected by an ATF temperature sensor 18, whether the mapped data the low pressure region is shifted in an enlarged direction. A state determining section 104 determines whether a throttle valve opening degree TH of the vehicle is totally closed or whether the line pressure is currently set to low line pressure. When the low pressure region is shifted in the enlarged direction and the throttle valve opening degree TH is totally closed or the line pressure is currently set to the low line pressure, a region changing section enlarges the low pressure region of the mapped data stored in the storage section.

5 Claims, 10 Drawing Sheets

(56) References Cited

U.S. PATENT DOCUMENTS

| | | |
|---|---|---|
| 6,168,547 B1 * | 1/2001 | Kawamura .................. 477/156 |
| 6,264,580 B1 * | 7/2001 | Tabata et al. ................. 477/149 |
| 7,006,907 B2 * | 2/2006 | Usuki et al. .................... 701/51 |
| 2004/0005956 A1 | 1/2004 | You |
| 2007/0232445 A1 * | 10/2007 | Yamamoto et al. ............. 477/98 |
| 2011/0112735 A1 * | 5/2011 | Takaishi et al. ................ 701/58 |

* cited by examiner

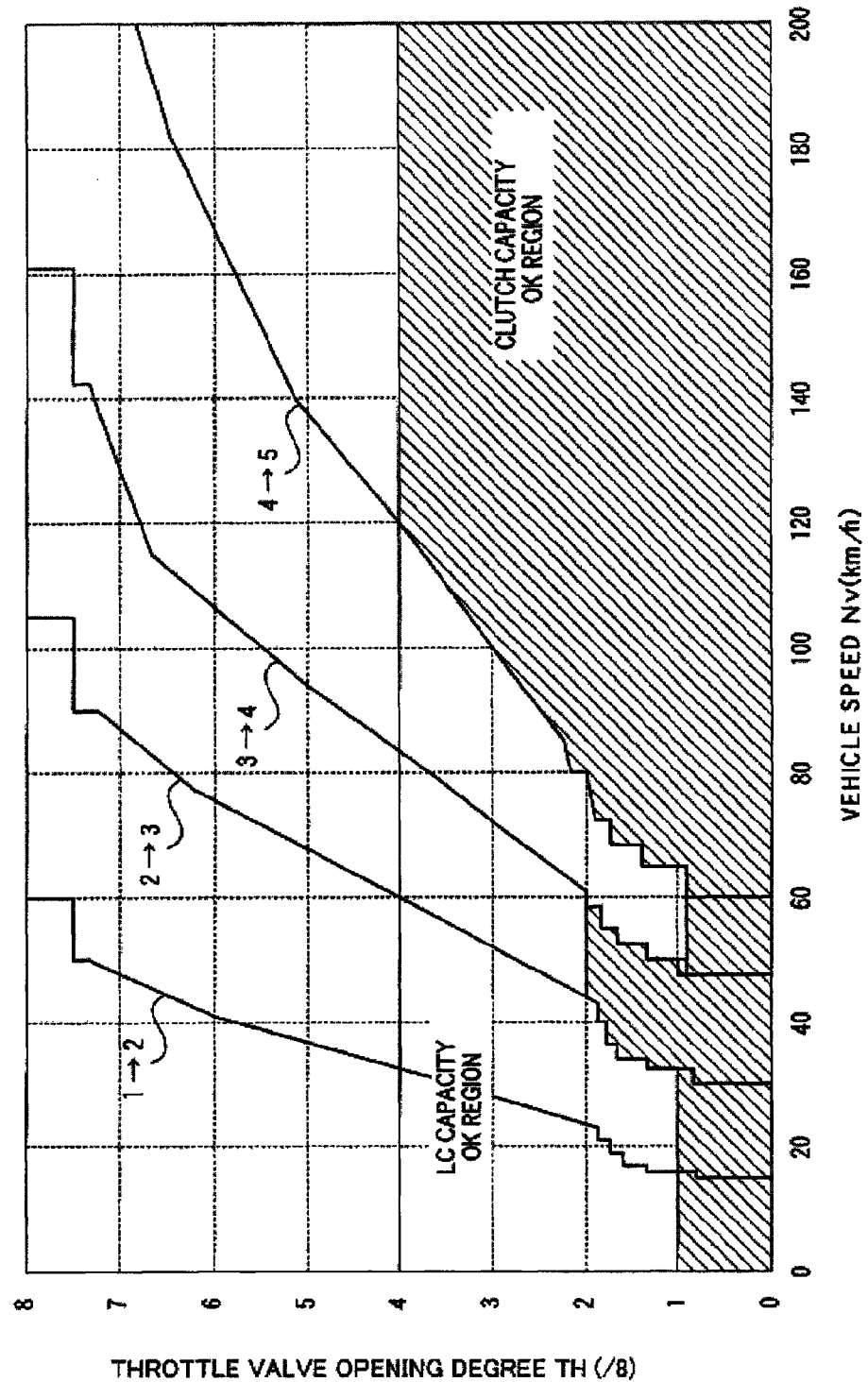

LINE PRESSURE CONTROL DEVICE FOR AUTOMATIC TRANSMISSION

TECHNICAL FIELD

The present invention relates to a line pressure control device for an automatic transmission of a vehicle, and particularly, the present invention relates to a line pressure control device for an automatic transmission capable of switching line pressure between two steps on the basis of temperature of hydraulic oil.

BACKGROUND ART

Heretofore, in order to heighten fuel economy (gasoline mileage) of a vehicle provided with an automatic transmission, it is known a line pressure control device for an automatic transmission capable of switching line pressure, which is established in a hydraulic control device for the automatic transmission, between two steps including low line pressure and high line pressure (for example, see Japanese Examined Patent Application Publication No. 6-15900 (hereinafter, referred to as "Patent Literature 1") and Japanese Patent Application Publication No. 2002-89680 (hereinafter, referred to as "Patent Literature 2")).

In the line pressure control device for the automatic transmission disclosed in Patent Literature 1, line pressure during shifting of gears is controlled in accordance with temperature of hydraulic oil, detected by an oil temperature sensor, for the automatic transmission. More specifically, it is first determined whether line pressure required during shifting of gears is in a low temperature region, a high temperature region or a shifting region between the low temperature region and high temperature region. Then, in the case where the line pressure required during shifting of gears is particularly in the shifting region, it is processed so that the line pressure to be controlled is caused to change gradually (or linearly) between a line pressure value for low temperature and a line pressure value for high temperature. Since this line pressure control device is configured in this manner, the line pressure is changed gradually. This makes it possible to achieve an effect that gear shift shock can be reduced by controlling line pressure without occurrence of a sudden change in the line pressure.

Further, in the line pressure control device for the automatic transmission disclosed in Patent Literature 2, line pressure is controlled so that, when a throttle valve opening degree is lowered in a stepwise manner, it is determined that line pressure is switched from high pressure to low pressure and start of this switching is delayed by a predetermined period of time since the determination has been made. This line pressure control device is configured in this manner, whereby it is possible to prevent a frictional engagement element from slipping due to a transiently changing state of torque when engine torque is reduced. For that reason, effects that it is possible to avoid gear shift shock and to prevent duration of life of a friction member of the frictional engagement element from being lowered are achieved.

Moreover, in the control of the line pressure, for example, as shown in FIG. 4, it is known that a low line pressure region and a high line pressure region are classified using mapped data on the basis of a throttle valve opening degree of a vehicle (longitudinal axis, a ratio when an effective opening degree of a throttle is divided into eight) and vehicle speed (horizontal axis). In the case of using such mapped data, the low line pressure region is set so that a torque capacity of a clutch (frictional engagement element) does not fall below engine torque at an arbitrary throttle valve opening degree and vehicle speed.

SUMMARY OF THE INVENTION

Problems to be Solved by the Invention

In the line pressure control devices for the automatic transmission of the Patent Literature 1 and Patent Literature 2 described above, it is possible to reduce or avoid gear shift shock, but there is a problem that it is impossible to meet needs for further improving gasoline mileage (fuel economy) of a vehicle.

Further, in the case of using the mapped data described above, it cannot be set to low line pressure even in a narrow region, in which it has no trouble with a torque capacity of a clutch, in view of factors of the gear shift shock and the like. There is also a problem that it is impossible to meet the needs for improving gasoline mileage (fuel economy) of the vehicle only by setting up the line pressure on the basis of the throttle valve opening degree and the vehicle speed.

The present invention is made in view of the above points, and it is an object of the present invention to provide a line pressure control device for an automatic transmission of a vehicle, which is capable of improving fuel economy of the vehicle by enlarging a low line pressure region of mapped data (hydraulic pressure control characteristics) or switching a plurality of mapped data on the basis of temperature of hydraulic oil. Further, it is another object of the present invention to provide a line pressure control device for an automatic transmission of a vehicle, which is capable of effectively preventing a clutch from slipping due to a difference between torque capacities of a clutch and an engine at timing of shifting or switching by changing a low line pressure region in a direction in which the low line pressure region is enlarged or switching mapped data in a direction in which the low line pressure region is enlarged.

Means for Solving the Problem

In order to solve the problems described above, a line pressure control device (10) for an automatic transmission according to one embodiment of the present invention is a line pressure control device (10) for an automatic transmission (3, 6), the line pressure control device (10) controlling line pressure (P) by regulating oil pressure from an oil pressure source (61) in the automatic transmission for a vehicle that sets up a predetermined gear by selecting any of a plurality of frictional engagement elements (clutches) to be caused to engage, the line pressure (P) becoming base pressure of hydraulic oil for controlling operations of the frictional engagement elements. The line pressure control device (10) includes: a storage section (101) for storing hydraulic pressure control characteristics (mapped data) for the line pressure (P) set up to any of a high pressure region and a low pressure region on the basis of an engine load (1); a hydraulic oil temperature sensor (18) for detecting temperature (TATF) of the hydraulic oil; and a region changing section (102) for changing hydraulic pressure control characteristics of the line pressure (P) stored in the storage section (101), on the basis of the temperature (TATF) of the hydraulic oil detected by the hydraulic oil temperature sensor (18), so as to enlarge the low pressure region.

According to the line pressure control device for the automatic transmission in one embodiment of the present invention, for example, since a coefficient of friction of hydraulic oil is increased when temperature TATF of the hydraulic oil is low temperature, by enlarging the low pressure region of the line pressure of the hydraulic pressure control characteristics in such a case, it is possible to reduce friction torque of the whole automatic transmission in a driving state of the vehicle in the enlarged region. This makes it possible to improve fuel economy (gasoline mileage) of the vehicle.

Further, in the line pressure control device for the automatic transmission according to one embodiment of the present invention, it is preferable that the region changing section (102) includes: a determining section (103) for determining whether the hydraulic pressure control characteristics (mapped data) are shifted in a direction in which the low pressure region is enlarged; and a state determining section (104) for determining whether a throttle valve opening degree (TH) of the vehicle is totally closed or not and whether the line pressure (P) is set to low pressure currently or not, wherein, in the case where the determining section (103) determines that the low pressure region is shifted in the enlarged direction and the state determining section (104) determines that the throttle valve opening degree (TH) is totally closed or the line pressure (P) is set to the low pressure currently, the region changing section (102) permits a change in the low pressure region toward the enlarged direction, and wherein the region changing section prohibits the change otherwise. This makes it possible to improve fuel economy (gasoline mileage) of the vehicle, and to effectively prevent slipping of the clutch that may occur due to a difference between a torque capacity of the engine and a torque capacity of the clutch (frictional engagement element) when the line pressure is switched from high pressure to low pressure. In this regard, in the present invention, an opening degree of an accelerator pedal (the degree of opening of the accelerator pedal APAT) of the vehicle may be used in place of the throttle valve opening degree (TH).

Moreover, in the configuration described above, it is preferable that the region changing section (102) is configured to permit the change without carrying out the determination by the state determining section (104) in the case where the determining section (103) determines that the low pressure region is shifted in a direction to be reduced. Thus, when there is no worry about slipping of the clutch (frictional engagement element), it is possible to change the low pressure region of the line pressure in the hydraulic pressure control characteristics so as to be enlarged while reducing a processing load of the whole line pressure control device (for example, electronic control unit 10).

Further, in order to solve the problems described above, a line pressure control device (10) for an automatic transmission according to another embodiment of the present invention is a line pressure control device (10) for an automatic transmission (3, 6), the line pressure control device (10) controlling line pressure (P) by regulating oil pressure from an oil pressure source (61) in the automatic transmission for a vehicle that sets up a predetermined gear by selecting any of a plurality of frictional engagement elements (clutches) to be caused to engage, the line pressure (P) becoming base pressure of hydraulic oil for controlling operations of the frictional engagement elements. The line pressure control device (10) includes: a storage section (101) for storing plural sets of hydraulic pressure control characteristics (mapped data) for the line pressure (P) so as to respectively correspond to a plurality of temperature ranges (for example, a plurality of temperature ranges whose boundaries are divided by 50° C., 80° C. and 100° C.), the hydraulic pressure control characteristics being set up to any of a high pressure region and a low pressure region on the basis of a load of an engine (1); a hydraulic oil temperature sensor (18) for detecting temperature (TATF) of the hydraulic oil; and a switching section (102) for switching the plural sets of hydraulic pressure control characteristics of the line pressure (P) stored in the storage section (101) on the basis of the temperature (TATF) of the hydraulic oil detected by the hydraulic oil temperature sensor (18).

According to the line pressure control device for the automatic transmission of another embodiment of the present invention, it is possible to reduce friction torque of the whole automatic transmission by switching to mapped data in which the low pressure region of the line pressure is enlarged when the temperature TATF of hydraulic oil is low temperature. For this reason, it is possible to improve fuel economy (gasoline mileage) of the vehicle.

Further, in the line pressure control device for the automatic transmission according to another embodiment of the present invention, it is preferable that the switching section (102) includes: a determining section (103) for determining whether the temperature (TATF) of the hydraulic oil is shifted from a high temperature side to a low temperature side of the plurality of temperature ranges or not; and a state determining section (104) for determining whether a throttle valve opening degree (TH) of the vehicle is totally closed or not and whether the line pressure (P) is set to low pressure currently or not, wherein, in the case where the determining section (103) determines that the temperature of the hydraulic oil is shifted from the high temperature side to the low temperature side of the temperature range and the state determining section (104) determines that the throttle valve opening degree (TH) is totally closed or the line pressure (P) is set to the low pressure currently, the switching section permits switching of the hydraulic pressure control characteristics, and wherein the switching section prohibits the switching otherwise. This makes it possible to improve fuel economy (gasoline mileage) of the vehicle, and to effectively prevent slipping of the clutch (frictional engagement element) that may occur due to a difference between a torque capacity of the engine and a torque capacity of the clutch, which is generated by switching the line pressure from high pressure to low pressure when the hydraulic pressure control characteristics are switched.

In this regard, reference numerals in parenthesis described above exemplify, for reference, corresponding components of an embodiment (will be described later). Further, temperature of oil pressure and the like in parenthesis described above exemplify ones corresponding to the embodiment.

Advantageous Effects of the Invention

According to the present invention, by causing a low line pressure region to be enlarged in mapped data of a throttle valve opening degree and vehicle speed when temperature of hydraulic oil is lower than predetermined temperature, it is possible to reduce friction torque of an automatic transmission in the enlarged region at high line pressure. This makes it possible to improve fuel economy of a vehicle.

BRIEF DESCRIPTION OF DRAWINGS

FIG. 4 is a graph showing mapped data, which are stored in a storage section, of line pressure against a relationship between a throttle valve opening degree TH and vehicle speed Nv (100° C.);

DETAILED DESCRIPTION OF THE INVENTION

Hereinafter, preferred embodiments of a line pressure control device for an automatic transmission according to the present invention will be described in detail with reference to the appending drawings.

(First Embodiment)

Figure 1:
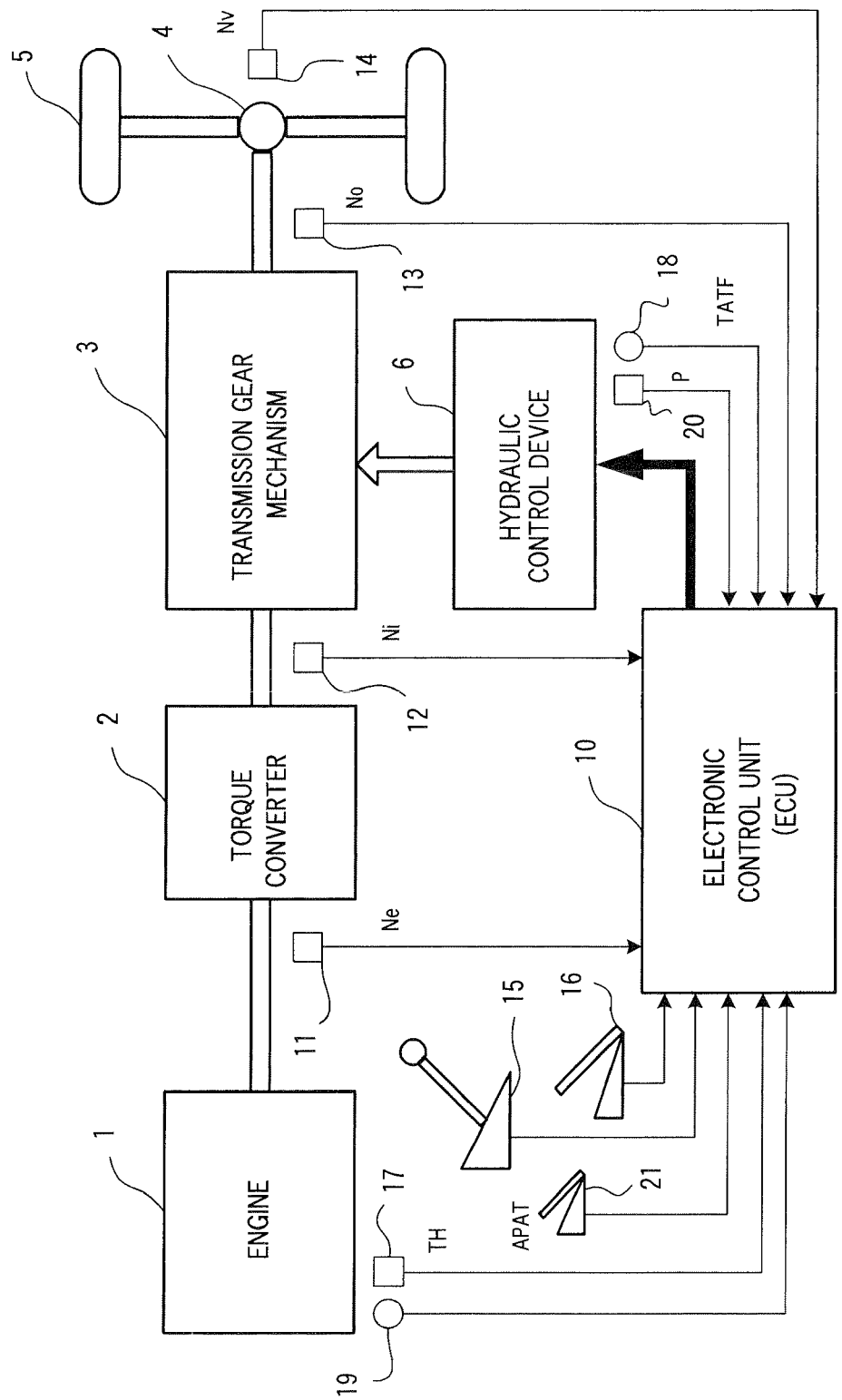
FIG. 1 is a block diagram schematically showing a power transmission system and a control system for a vehicle provided with a line pressure control device for an automatic transmission according to a first embodiment of the present invention.

FIG. 1 is a block diagram schematically showing a power transmission system and a control system for a vehicle provided with a line pressure control device for an automatic transmission according to a first embodiment of the present invention. The power transmission system for the vehicle includes: an engine 1 that is a power source; a torque converter 2 that is a fluid coupling for transmitting rotation output of the engine 1 to a transmission gear mechanism 3; the transmission gear mechanism 3 that changes and outputs gears with a set speed ratio when rotation output of the torque converter 2 is inputted thereto; and a differential gear mechanism 4 that distributes the rotation output of the transmission gear mechanism 3 between right and left wheels (for example, rear wheels) 5. A hydraulic control device 6 is provided so as to be attached to the torque converter 2 and the transmission gear mechanism 3. This hydraulic control device 6 causes a plurality of frictional engagement elements (clutches and the like) of an oil pressure control type provided in the torque converter 2 and the transmission gear mechanism 3 to engage or release (disengage) with predetermined combination. Thus, the hydraulic control device 6 carries out lock-up of the torque converter 2 and a setup of an input/output speed ratio to a required gear in the transmission gear mechanism 3. An automatic transmission of the vehicle is configured by the torque converter 2, the transmission gear mechanism 3, the hydraulic control device 6 and the like. Further, the line pressure control device according to the present embodiment is configured by the hydraulic control device 6 and an electronic control unit 10 (will be described later).

The control system for controlling the power transmission system of the vehicle is constructed by sensors provided at respective portions of the vehicle, an electronic control unit (ECU) 10 to which an output of each of the sensors is inputted, the hydraulic control device 6 controlled by the electronic control unit 10 and the like. A rotation sensor 11 detects the number of revolutions (the number of revolutions of the engine 1) Ne of an input shaft of the torque converter 2. A rotation sensor 12 detects the number of revolutions Ni of an input shaft of the transmission gear mechanism 3 (that is, an output shaft of the torque converter 2). A rotation sensor 13 detects the number of revolutions No of an output shaft of the transmission gear mechanism 3. A vehicle speed sensor 14 detects traveling speed (vehicle speed) Nv of the vehicle. In this regard, without providing the vehicle speed sensor 14 for specifically detecting the vehicle speed Nv, the vehicle speed Nv may be calculated on the basis of the number of revolutions Ni of the input shaft or the number of revolutions No of the output shaft. For example, the vehicle speed Nv can be detected (or calculated) on the basis of a relational expression such as "Nv=Ni×(transmission gear ratio)×(circumferential length of tire)" or "Nv=No×(circumferential length of tire)". A shift lever position sensor 15 detects a position of a shift lever operated by a driver. As is known in the art, the positions of the shift lever include P (parking), R (reverse drive), N (neutral), and D (forward drive by automatic transmission mode), for example. Moreover, positions for manually specifying a specific gear such as a third gear, a second gear or a first gear may be provided.

A brake sensor 16 detects that a brake pedal is pressed by a predetermined amount by the driver and brake is thereby applied. A throttle sensor 17 detects a degree TH of a throttle of the engine 1 that is set up in accordance with pressing of an accelerator pedal. An accelerator pedal sensor 21 detects the degree of opening of the accelerator pedal APAT in accordance with pressing of the accelerator pedal. An ATF temperature sensor 18 detects temperature (ATF oil temperature) TATF of hydraulic oil in the hydraulic control device 6. An oil pressure sensor 20 detects line pressure P regulated by means of a linear solenoid valve (not shown in the drawings) in the hydraulic control device 6. A cooling water temperature sensor 19 detects temperature of cooling water for the engine 1 (cooling water temperature).

The line pressure control device for the automatic transmission according to the present embodiment controls the line pressure P, which becomes base pressure of the hydraulic oil, for controlling operations of the frictional engagement elements (clutches and the like) by regulating oil pressure from an oil pressure source (an oil pump 61, will be described later) by means of a regulator valve 62 (will be described later). Further, the line pressure control device changes low pressure regions of hydraulic pressure control characteristics (mapped data) of the line pressure P (will be described later) on the basis of the temperature TATF of the hydraulic oil.

Any known configuration may be adopted appropriately as a concrete configuration of the power transmission system and the control system of the vehicle shown in FIG. 1. The line pressure control device for the automatic transmission according to the present invention includes the electronic control unit 10, and is implemented as one of various control functions that the electronic control unit 10 can carry out. In embodiments described below, the line pressure control device for the automatic transmission according to the present invention is implemented by computer programs equipped by the electronic control unit 10. However, the line pressure control device for the automatic transmission according to the present invention is not limited to such computer programs, but can of course be configured by dedicated electronic circuit hardware.

Figure 2:
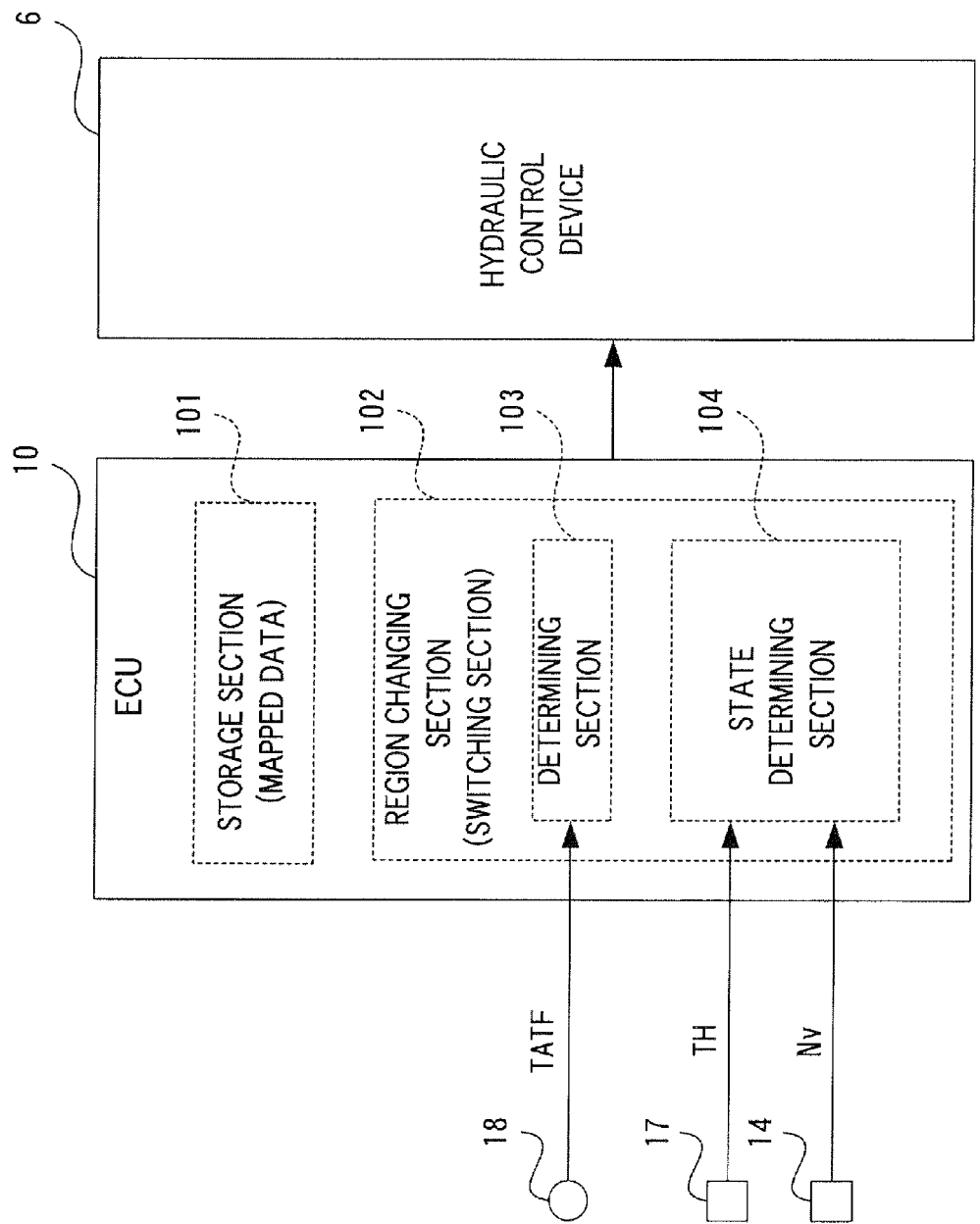
FIG. 2 is a block diagram showing a control system of a low line pressure region retrieving and changing process, which is carried out by the line pressure control device for the automatic transmission according to the first embodiment of the present invention.

FIG. 2 is a block diagram showing a control system of a low line pressure region retrieving and changing process, which is carried out by the line pressure control device for the automatic transmission according to the present invention. As shown in FIG. 2, the electronic control unit 10 includes a storage section 101 and a region changing section 102. Hydraulic pressure control characteristics of the line pressure P (will be described later in detail), which is set to any of a high pressure region and a low pressure region in a graph of the throttle valve opening degree TH and the vehicle speed Nv (line pressure control characteristic view) on the basis of a load of the engine 1, are stored in the storage section 101 as mapped data. The region changing section 102 changes the low line pressure region so as to be enlarged in the mapped data of the line pressure P, stored in the storage section 101, on the basis of temperature of hydraulic oil (ATF oil temperature) TATF detected by the ATF temperature sensor 18. The region changing section 102 includes a determining section 103 and a state determining section 104. The determining section 103 determines whether the hydraulic pressure control characteristics are shifted in a direction in which the low line pressure region is enlarged or not, that is, whether the temperature TATF of the hydraulic oil is shifted to a low temperature side or not. The state determining section 104 determines whether the throttle valve opening degree TH of the vehicle is totally closed or not, or whether the line pressure P is set to low line pressure currently or not.

In the line pressure control device for the automatic transmission according to the present invention, as will be described later in FIG. 3, the line pressure P can be switched between two steps including high line pressure and low line pressure. In the case where the determining section 103 determines that the low line pressure region is shifted in the enlarged direction and the state determining section 104 determines that the throttle valve opening degree TH is totally closed or the line pressure P is set to the low line pressure currently, the region changing section 102 permits such a change in the low line pressure region in the enlarged direction. The region changing section 102 prohibits the change otherwise. The electronic control unit 10 then outputs, to the hydraulic control device 6, a command for establishing necessary line pressure P on the basis of mapped data in which the low line pressure region is changed to be enlarged by the region changing section 102 or mapped data currently used and a current driving state of the vehicle. In this regard, characteristic control of the present invention will be described later using a flowchart.

Next, a configuration of an oil pressure circuit capable of changing the line pressure P between two steps in the line pressure control device for the automatic transmission according to the present embodiment will be described. FIG. 3 is a part of an oil pressure circuit applied to the line pressure control device for the automatic transmission according to the present invention. As shown in FIG. 3, this oil pressure circuit includes: an oil pump 61 that becomes an oil pressure source; a regulator valve 62; and a solenoid valve 63. The regulator valve 62 regulates base oil pressure applied from this oil pump 61, and generates the line pressure P, which becomes base pressure of hydraulic oil for engagement of the frictional engagement element such as a clutch. The solenoid valve 63 applies auxiliary pressure to the regulator valve 62 for switching the line pressure P between two steps. Since the solenoid valve 63 is provided in this manner, it is possible to switch the line pressure P between the two steps including the high line pressure and the low line pressure by adding a step in the regulator valve 62 and switching a pressure receiving area of the regulator valve 62.

The oil pump 61 suctions hydraulic oil from an oil tank (not shown in the drawings) to pump the suctioned hydraulic oil to an oil passage 70. After this hydraulic oil is regulated to predetermined pressure by the regulator valve 62, the hydraulic oil is supplied to each clutch through an oil passage 71 and valves (not shown in the drawings) and via the linear solenoid valve. Here, when it becomes a region in which high engagement hydraulic pressure is not required, that is, a clutch capacity OK region of FIG. 4, in the hydraulic control device 6, the solenoid valve 63 that receives the hydraulic pressure supplied from the oil pump 61 via an oil passage 72 is opened (ON) by control of the electronic control unit 10. In response to this open of the solenoid valve 63, the regulator valve 62 is controlled by means of the hydraulic oil passing through an oil passage 75 (signal pressure with low line pressure) and the hydraulic oil passing through an oil passage 73. By enlarging the pressure receiving area of the regulator valve 62 in this manner, the line pressure P regulated by the regulator valve 62 is switched from high pressure to low pressure.

Further, when it becomes a region in which the high engagement hydraulic pressure is required, that is, a region other than the clutch capacity OK region of FIG. 4 (an LC capacity OK region and the like), the hydraulic control device 6 carries out an operation to switch the line pressure P from the low pressure to the high pressure. In this case, by closing the solenoid valve 63 (turning it OFF) by control of the electronic control unit 10, the hydraulic oil (signal pressure with low line pressure) is not supplied to the oil passage 75. Thus, the regulator valve 62 is controlled by means of only the hydraulic oil passing through the oil passage 73. By making the pressure receiving area of the regulator valve 62 smaller in this manner, the line pressure P is switched from the low pressure to the high pressure. In this regard, in the present embodiment, for example, the high line pressure is set up to $9.5\pm0.25$ kg/cm$^2$, and the low line pressure is set up to $6.0\pm0.25$ kg/cm$^2$.

FIG. 4 is a graph showing mapped data (temperature of the hydraulic oil: 100° C.), which are stored in the storage section 101, of the line pressure P against a relationship between the throttle valve opening degree TH and the vehicle speed Nv. In this regard, the throttle valve opening degree TH is indicated by a ratio in which eight is set to full throttle, zero is set to totally closing and the whole region is divided into eight. Further, each of solid lines (heavy lines) indicates a boundary line between shifts at a shift up operation, and they are boundary lines for shift up of; a first gear (Low)→a second gear; the second gear→a third gear; the third gear→a fourth gear; and the fourth gear→a fifth gear (Top) from the left side. Boundary lines between adjacent shifts at shift down operations normally differ from the boundary lines between adjacent shifts at shift up operations. However, in the present embodiment, since there is no relationship between boundary lines of high pressure and low pressure of the line pressure P, illustration of the boundary lines at shift down operations is omitted. In this regard, the throttle valve opening degree TH is utilized for a longitudinal axis as a load to the engine 1 in the present embodiment. However, since it is thought that there is substantially a proportional relationship, the degree of opening of the accelerator pedal APAT may be utilized in place of the throttle valve opening degree TH.

In the present embodiment, the mapped data are obtained by calculating a low line pressure region from a torque capacity of a clutch at line pressure of 6 kgf/cm² and temperature of hydraulic oil of 100° C. In the graph of FIG. 4, a shaded area indicates a region in which a torque capacity of a clutch does not fall below a torque capacity of the engine 1 (a clutch capacity OK region in the drawing). Further, a region, in which the throttle valve opening degree TH is not higher than four, other than the clutch capacity OK region indicates a region in which a torque capacity of an LC (lock-up) clutch does not fall below the torque capacity of the engine 1 (LC capacity OK region in the drawing).

Figure 7:
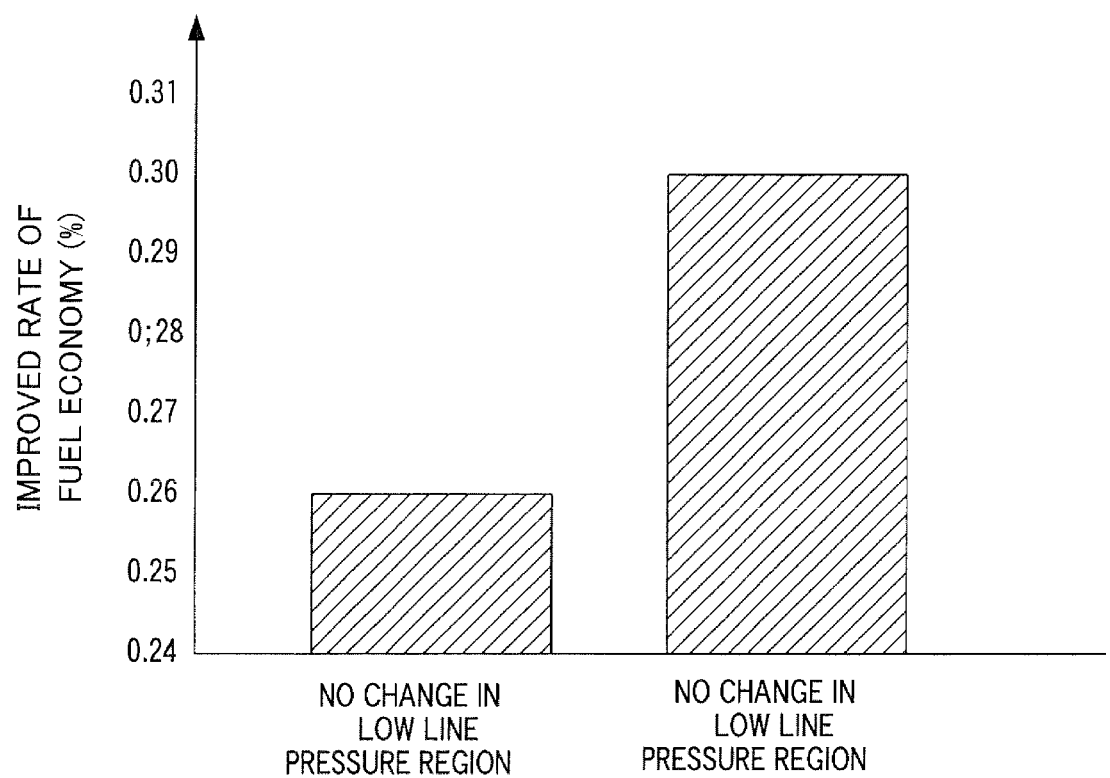
FIG. 7 is a graph showing a progress rate of gasoline mileage of the vehicle as to whether the low line pressure region is to be changed or not.

In conventional line pressure control, for example, line pressure during driving of a vehicle has been set up using only mapped data of FIG. 4. In a test mode (average value of five times) on the assumption of a city driving state (or a field driving state), about 85% of driving during test driving is covered with the low line pressure using the mapped data. Thus, as shown in FIG. 7, gasoline mileage (fuel economy) is improved by 0.26% compared with one in which the line pressure P is not switched between high line pressure and low line pressure.

Figure 5A:
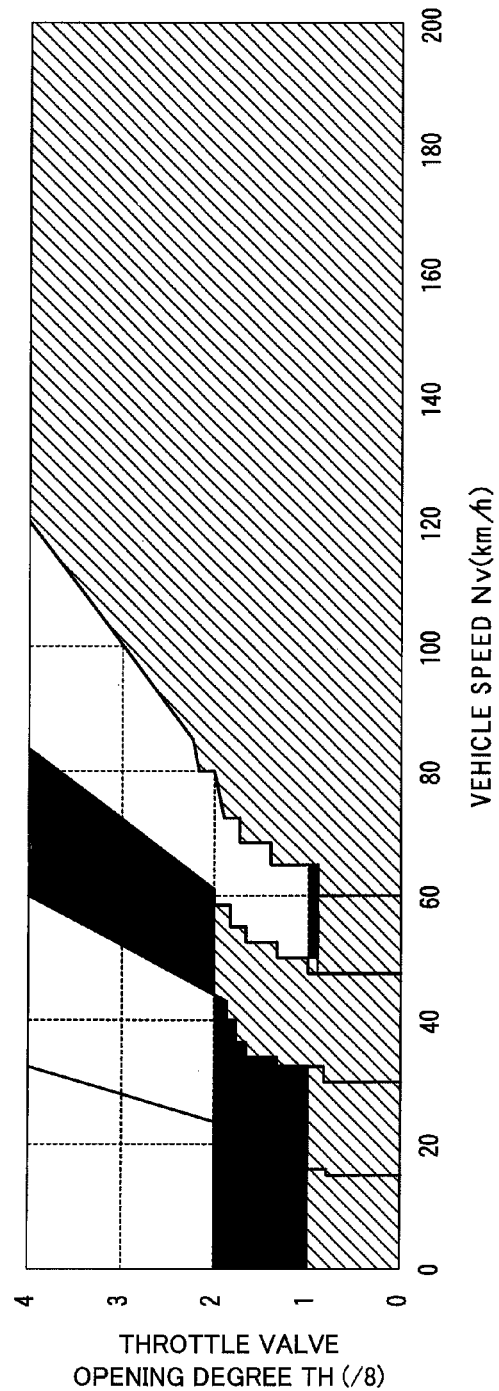
FIG. 5 is graphs showing mapped data of line pressure against a relationship between a throttle valve opening degree TH and vehicle speed Nv (50° C. and 80° C.)
Figure 5B:
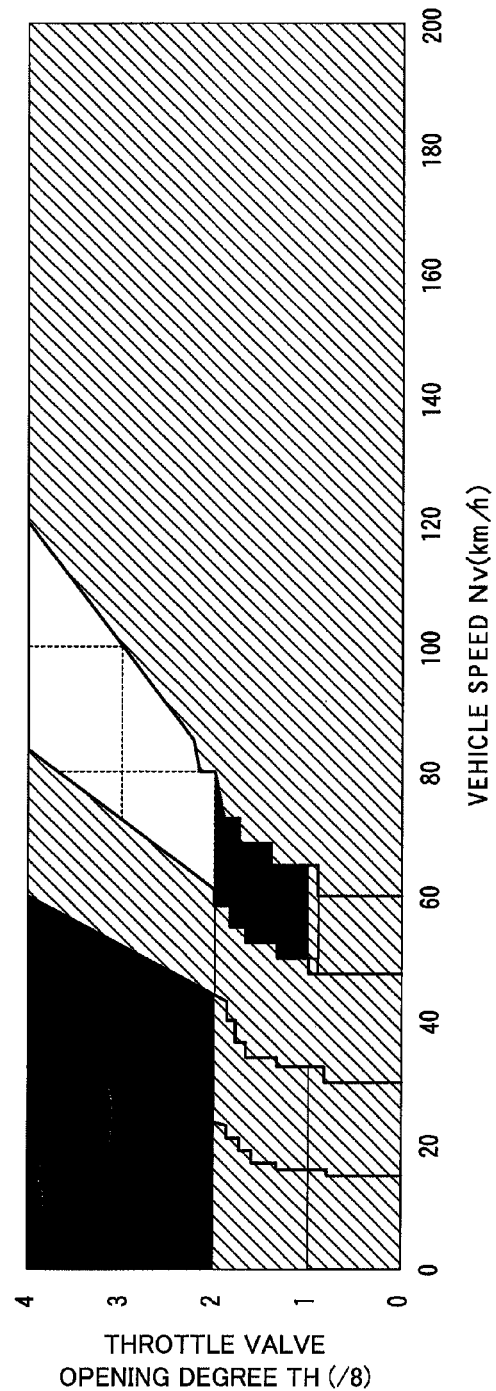

FIG. 5 is graphs showing mapped data of the line pressure P against a relationship between the throttle valve opening degree TH and the vehicle speed Nv at 50° C. and 80° C. In FIG. 5(a), the low line pressure region enlarged toward the clutch capacity OK region of the mapped data at the oil temperature of 100° C. shown in FIG. 4 is shown by a fill region. The mapped data are used when temperature of the hydraulic oil is 80° C., for example. Further, in FIG. 5(b), the low line pressure region enlarged toward the clutch capacity OK region of the mapped data at the oil temperature of 80° C. shown in FIG. 5 is shown by a fill region. The mapped data are used when temperature of the hydraulic oil is 50° C., for example. In the present invention, as shown in FIG. 4 and the graph of FIG. 5, the region changing section 102 changes the low line pressure region so as to be enlarged in a stepwise manner as the oil temperature TATF of the hydraulic oil detected by the ATF temperature sensor 18 changes from high temperature to low temperature.

Figure 6A:
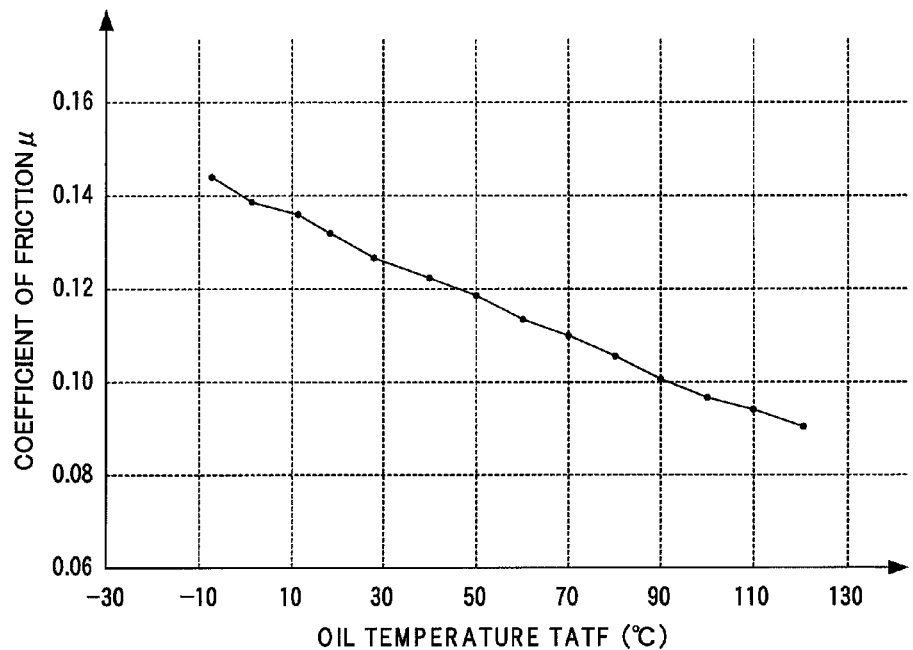
FIG. 6 is a graph respectively showing a relationship of a coefficient of friction against temperature of the hydraulic oil and a relationship between the line pressure and the friction torque.
Figure 6B:
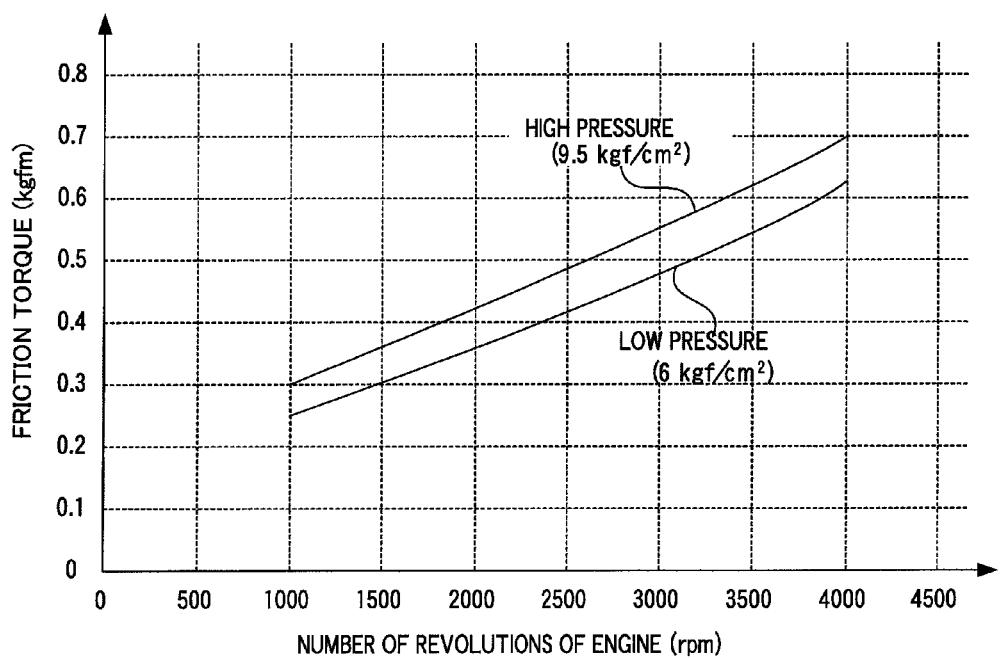

Thus, by enlarging the low line pressure region at the temperature (oil temperature) of the hydraulic oil of 50° C. and 80° C. in a stepwise manner, driving at the low line pressure during test run similar to the above is improved to about 97%. Therefore, as shown in FIG. 7, it is possible to improve gasoline mileage (fuel economy) by 0.30% compared with one in which switching of line pressure is not carried out, and it is also possible to improve gasoline mileage (fuel economy) by 0.04% compared with one in which a low line pressure region is not changed in accordance with the temperature TATF of the hydraulic oil. This is because a coefficient of friction μ of the hydraulic oil is increased as the temperature TATF of the hydraulic oil drops as shown in FIG. 6(a), and friction torque of the whole transmission gear mechanism 3 with respect to the number of revolutions Ne (rpm) of the engine 1 becomes lower as the line pressure P thus set up is lower as shown in FIG. 6(b). Therefore, according to the line pressure control device for the automatic transmission of the present invention, by causing the low line pressure region to be enlarged as shown in FIG. 5 when the temperature TATF of the hydraulic oil is low temperature, it is possible to reduce the friction torque of the whole transmission gear mechanism 3 in a driving state of the vehicle in the enlarged region. For that reason, it is possible to improve fuel economy of the vehicle.

Figure 8:
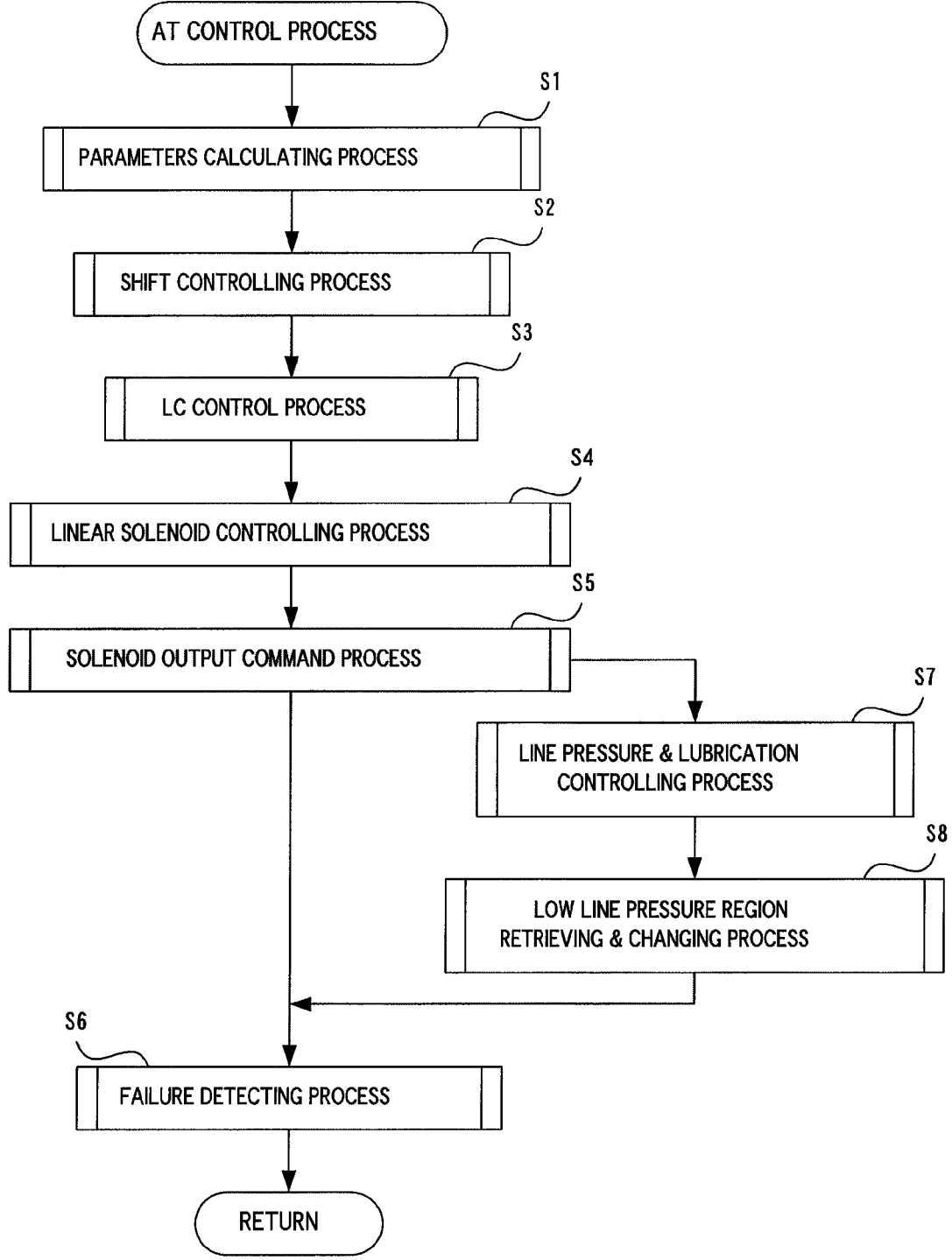
FIG. 8 is a flowchart showing an AT control process of the vehicle provided with the line pressure control device for the automatic transmission according to the first embodiment of the present invention.

Next, an operation of the line pressure control device for the automatic transmission according to the first embodiment of the present invention will be described. FIG. 8 is a flowchart showing an AT control process of the vehicle provided with the line pressure control device for the automatic transmission according to the present invention. In this regard, since a low line pressure region retrieving and changing process at Step S8 in the AT control process is a feature of the present invention, flowcharts of subroutines for other processes are omitted, and an outline of the processes will be described briefly using FIG. 1. Further, the flowchart of FIG. 8 is repeatedly carried out every ten milliseconds, for example.

In the AT control process, the electronic control unit 10 first carries out a various parameters calculating process for controlling the automatic transmission as a whole (Step S1). Here, the electronic control unit 10 acquires detection signals detected by the various rotation sensors 11 to 13, the vehicle speed sensor 14, the shift lever position sensor 15, the throttle sensor 17, the accelerator pedal sensor 21, the ATF temperature sensor 18, the cooling water temperature sensor 19, the oil pressure sensor 20 and the like, for example, and calculates various parameters necessary for using these detection signals.

Subsequently, the electronic control unit 10 carries out a shift controlling process on the basis of the calculated parameters (Step S2). Here, the electronic control unit 10 sets up a shift mode on the basis of a position of the shift lever detected by the shift lever position sensor 15, for example.

Subsequently, the electronic control unit 10 carries out engagement control of a lock-up clutch (not shown in the drawings) of the torque converter 2 (Step S3). Here, the electronic control unit 10 carries out engagement control or slipping control for the lock-up clutch in the torque converter 2 in accordance with a driving state of the vehicle.

Subsequently, the electronic control unit 10 carries out a linear solenoid controlling process for a group of linear solenoid valves (not shown in the drawings) within the hydraulic control device 6 (Step S4), and carries out a solenoid output command process for sending output commands to a group of shift solenoid valves (not shown in the drawings) (Step S5). Here, the electronic control unit 10 switches oil passages in the hydraulic control device 6 to control engagement of a transmission shift clutch in accordance with a shift up or shift down command by controlling the group of shift solenoid valves and the group of linear solenoid valves.

Subsequently, the electronic control unit 10 carries out a line pressure and lubrication controlling process (Step S7). Here, the hydraulic control device 6 regulates base oil pressure applied from the oil pump 61 on the basis of a command from the electronic control unit 10 by means of the regulator valve 62 to generate the line pressure P, and switches the line pressure P between high line pressure and low line pressure on the basis of a command outputted from the electronic control unit 10 in accordance with a driving state of the vehicle by controlling ON/OFF of the solenoid valve 63. Further, the hydraulic control device 6 adjusts the supplied amount of lubricating oil to various bearings, clutches and the like by controlling open/close of a control valve (relief valve or switching valve) provided at a lubricating oil passage as required.

Subsequently, the electronic control unit 10 carries out a low line pressure region retrieving and changing process (will be described later; in a second embodiment, a map switching process) (Step S8). The electronic control unit 10 then carries out a failure detecting process for detecting existence or absence of failure of any sensor, any valve or the like related to various kinds of controls in parallel with this series of oil pressure control processes (Step S6), and terminates this AT control process.

Figure 9:
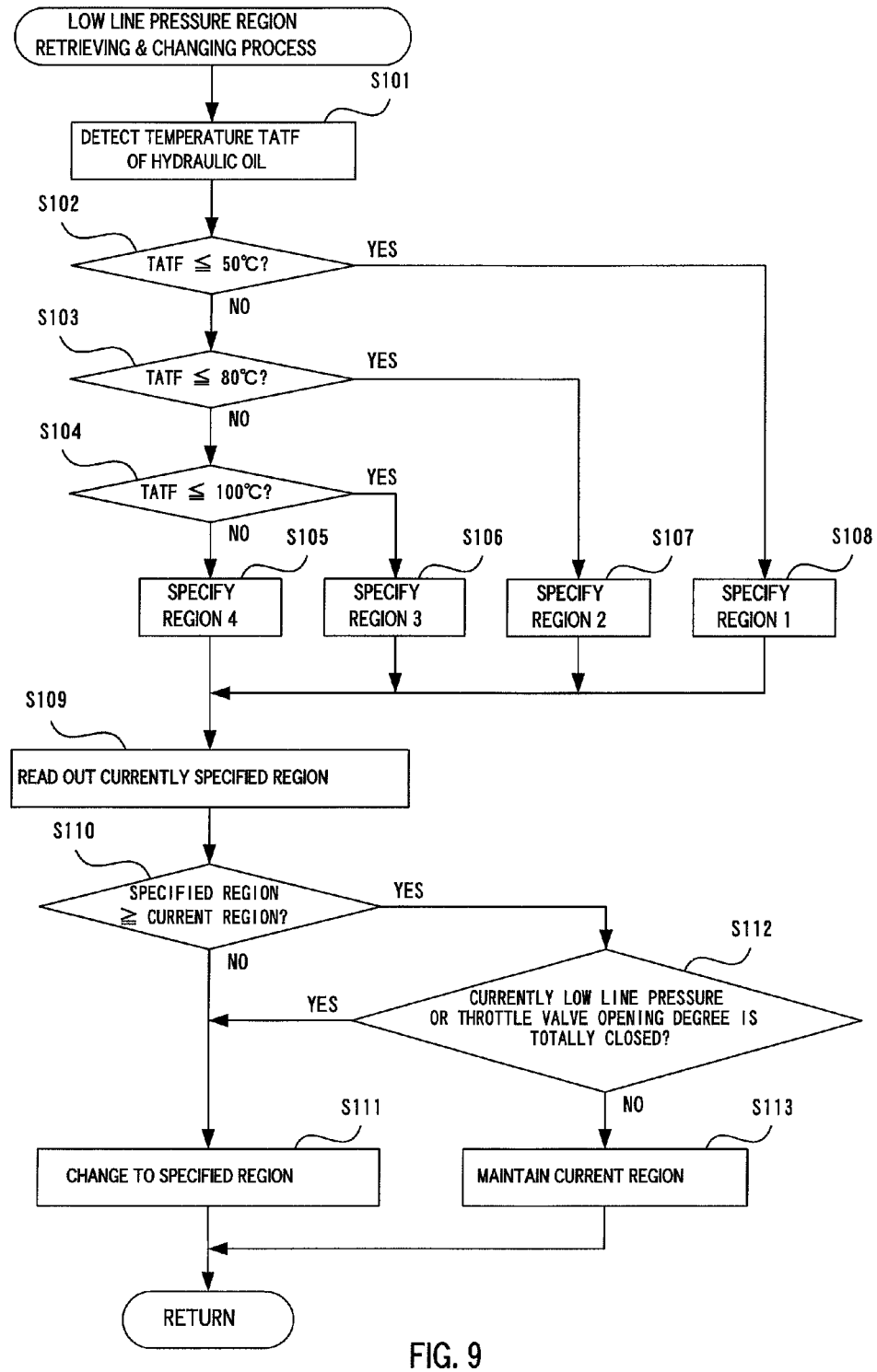
FIG. 9 is a flowchart showing a low line pressure region retrieving and changing process according to the first embodiment of the present invention.

FIG. 9 is a flowchart showing the low line pressure region retrieving and changing process carried out at Step S8 in the flowchart of FIG. 8. When it shifts to Step S8 in the AT control process, the electronic control unit 10 carries out a subroutine for this low line pressure region retrieving and changing process.

The region changing section 102 first acquires temperature (oil temperature) TATF of hydraulic oil detected by the ATF temperature sensor 18 (Step S101). Then, the determining section 103 of the region changing section 102 in turn determines whether this oil temperature TATF is not higher than 50° C. or not (Step S102), whether it is higher than 50° C. and not higher than 80° C. or not (Step S103), and whether it is higher than 80° C. and not higher than 100° C. or not (Step S104). The region changing section 102 specifies each of Regions 1 to 4 on the basis of its determination result (Steps S105 to S108). In this regard, in the present embodiment, for example, Region 1 corresponds to the whole clutch capacity OK region for the mapped data at 50° C. described above (see FIG. 5(a)); Region 2 corresponds to the whole clutch capacity OK region for the mapped data at 80° C. described above (see FIG. 5(b)); and Region 3 corresponds to the whole clutch capacity OK region for the mapped data at 100° C. described above (see FIG. 4). Although its illustration is omitted, Region 4 may be one having a clutch capacity OK region whose area is further reduced from the clutch capacity OK region of the mapped data at 100° C. (see FIG. 4).

Subsequently, the region changing section 102 reads out a region of mapped data currently specified by the electronic control unit 10 and stored in the storage section 101 (Step S109). The determining section 103 then compares the region newly specified at Steps S105 to S108 with the region currently specified, and determines whether the newly specified region is larger than the currently specified region or not (Step S110).

In the case where it is determined that the newly specified region is larger than the currently specified region ("Yes" at Step S110), this means that the temperature TATF of the hydraulic oil is shifted to the low temperature side. The state determining section 104 determines whether the throttle valve opening degree TH is totally closed or not and whether the line pressure P is set to the low line pressure currently or not (Step S112).

Then, in the case where the state determining section 104 determines that the throttle valve opening degree TH becomes a totally close state or it is set to the low line pressure currently, there is no problem of slipping of a clutch (frictional engagement element) due to a difference between the torque capacity of the engine 1 and the torque capacity of the clutch. For that reason, the region changing section 102 permits the change in the low line pressure region newly specified in the enlarged direction, and changes the low line pressure region into the specified region (Step S111). Namely, the electronic control unit 10 stores (or saves) the newly specified region in the storage section 101, and terminates this low line pressure region retrieving and changing process. Further, in the case where the state determining section 104 determines, at Step S112, that the throttle valve opening degree TH is not totally closed and it is set to the high line pressure currently, the region changing section 102 prohibits the change, and maintains the region currently specified (Step S113). The electronic control unit 10 terminates this low line pressure region retrieving and changing process.

On the other hand, in the case where it is determined that the newly specified region is smaller than the currently specified region ("No" at Step S110), this means that the temperature TATF of the hydraulic oil is shifted to a high temperature side. In this case, it is a change in a direction in which the low line pressure region is reduced, and there is a region in which the line pressure P is shifted from the low line pressure to the high line pressure. However, no problem occurs that the clutch is slipped due to a difference between torque capacities of the clutch and the engine 1. For that reason, without carrying out the determination at Step S112 by the state determining section 104, the region changing section 102 permits a change on the newly specified low line pressure region in an enlarged direction, and changes the low line pressure region in the specified region (Step S111). Namely, the electronic control unit 10 stores (or saves) the newly specified region in the storage section 101, and terminates this low line pressure region retrieving and changing process.

(Second Embodiment)

A line pressure control device for an automatic transmission according to a second embodiment of the present invention will be described. Here, portions of the second embodiment different from those in the line pressure control device for the automatic transmission according to the first embodiment will be described in detail, and explanation of the similar components is omitted. In the present embodiment, the electronic control unit 10 is provided with a switching section 102 in place of the region changing section 102 shown in FIG. 2 in the first embodiment. In the case where the determining section 103 determines that a temperature range is shifted from a high temperature side to a low temperature side and the state determining section 104 determines that the throttle valve opening degree is totally closed or the line pressure P is set to the low line pressure currently, this switching section 102 permits switching from the currently specified mapped data (that is, those stored in the storage section 101) to mapped data specified on the basis of the oil temperature TATF of the hydraulic oil detected by the ATF temperature sensor 18. On the other hand, the switching section 102 prohibits the switching otherwise. Further, in the storage section 101, a plurality of mapped data as shown in FIG. 4 and FIG. 5 are stored so as to respectively correspond to the temperature ranges TATF of hydraulic oil.

Figure 10:
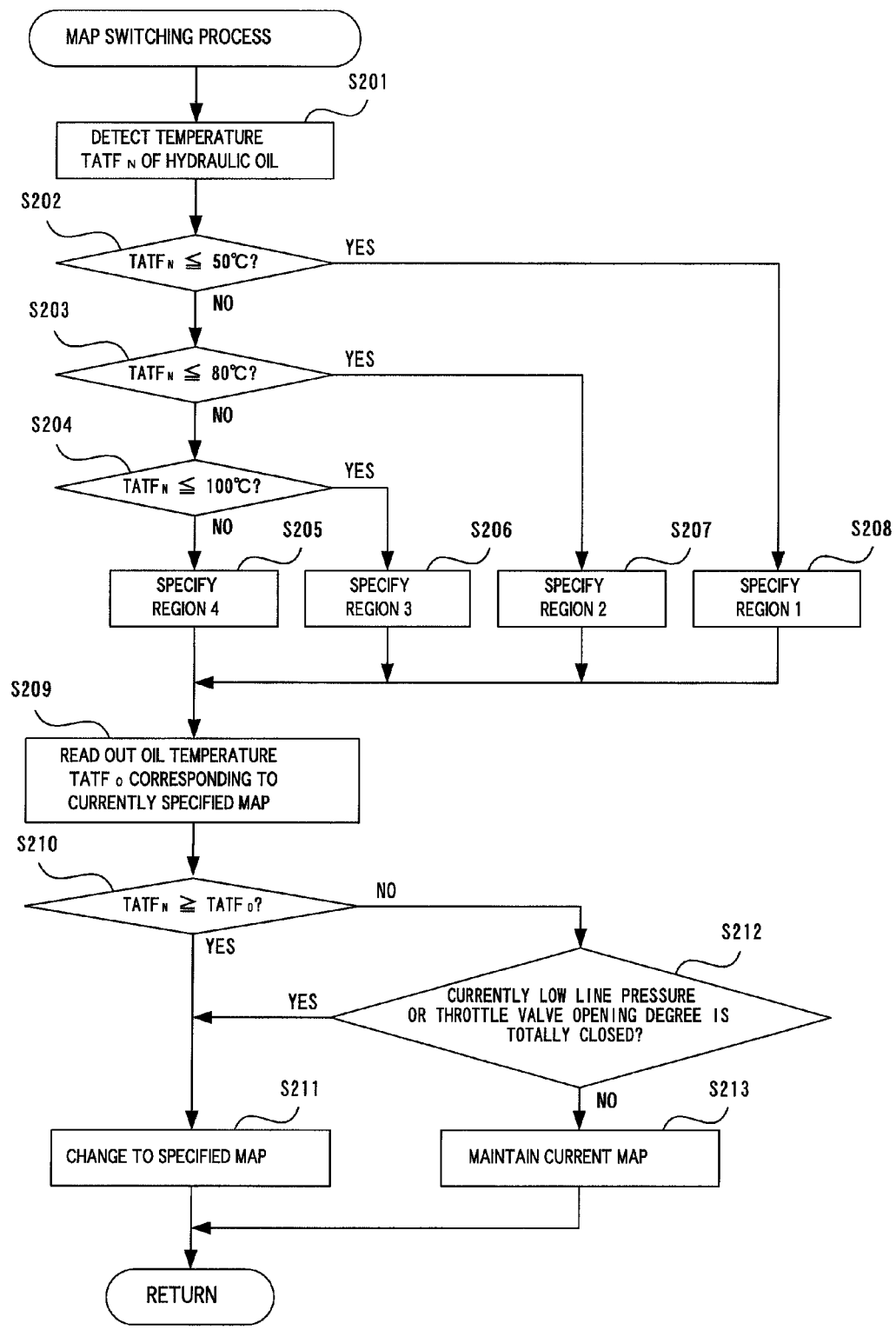
FIG. 10 is a flowchart showing a low line pressure region retrieving and changing process according to a second embodiment of the present invention.

Next, an operation of the line pressure control device for the automatic transmission according to the second embodiment of the present invention will be described. In this regard, since an overall operation shown in the flowchart of FIG. 8 (AT control process) is substantially the same, its explanation is omitted. FIG. 10 is a flowchart showing a map switching process according to the second embodiment of the present invention. As well as the case in the first embodiment, when it shifts to Step S8 in the AT control process, the electronic control unit 10 carries out a subroutine of this map switching process in place of the low line pressure region retrieving and changing process of the first embodiment.

The switching section 102 first acquires temperature (oil temperature) $TATF_N$ of the hydraulic oil detected by the ATF temperature sensor 18 (Step S201). Then, the determining section 103 of the switching section 102 in turn determines whether this oil temperature $TATF_N$ is not higher than 50° C. or not (Step S202), whether the oil temperature $TATF_N$ is not lower than 50° C. and not higher than 80° C. or not (Step S203), and whether the oil temperature $TATF_N$ is not lower than 80° C. and not higher than 100° C. or not (Step S204). The switching section 102 specifies each of Maps 1 to 4 on the basis of its determination result (Steps S205 to S208). In this regard, in the present embodiment, Map 1 corresponds to the mapped data at 50° C. described above, Map 2 corresponds to the mapped data at 80° C. described above and Map 3 corresponds to the mapped data at 100° C. described above, for example. Although its illustration is omitted as well as the first embodiment, Map 4 may be a map having a clutch capacity OK region whose area is reduced from the clutch capacity OK region of the mapped data at 100° C.

Subsequently, the switching section 102 reads out oil temperature $TATF_O$ that is currently specified by the electronic control unit 10 and corresponds to the mapped data stored in the storage section 101 (Step S209). The determining section 103 then determines whether the oil temperature $TATF_N$ corresponding to the mapped data newly specified at Steps S205 to S208 is not lower than the oil temperature $TATF_O$ corresponding to the mapped data specified currently or not (Step S210).

In the case where it is determined that the oil temperature $TATF_N$ is not lower than the oil temperature $TATF_O$ ("Yes" at Step S210), this means that the temperature TATF of the hydraulic oil is shifted to the high temperature side. The switching section 102 switches from the currently specified mapped data to the mapped data specified at Steps S205 to S208 (Step S211), and the electronic control unit 10 terminates this map switching process.

On the other hand, in the case where it is determined that the oil temperature $TATF_N$ is lower than the oil temperature $TATF_O$ ("No" at Step S210), this means that the temperature TATF of the hydraulic oil is shifted to the low temperature side. The state determining section 104 respectively determines whether the throttle valve opening degree TH is totally closed or not, and whether the line pressure P is currently set up to the low line pressure or not (Step S212). In the case where the state determining section 104 determines that the throttle valve opening degree TH is totally closed or it is set to the low line pressure currently, the switching section 102 switches from the currently specified mapped data to the mapped data specified at Steps S205 to S208 (Step S211). The electronic control unit 10 then stores (or saves) the newly specified mapped data in the storage section 101, and terminates this map switching process. Further, in the case where the state determining section 104 determines, at Step S212, that the throttle valve opening degree TH is not totally closed and it is set to the high line pressure currently, the switching section 102 prohibits the switching, and maintains the currently specified map (Step S213). The electronic control unit 10 terminates this map switching process.

As explained above, according to the line pressure control device for the automatic transmission of the first embodiment of the present invention, the switching section 102 of the electronic control unit 10 changes, on the basis of the temperature TATF of the hydraulic oil detected by the storage section 101, the low line pressure region in the mapped data of the line pressure P (hydraulic pressure control characteristics) stored in the ATF temperature sensor 18 so as to be enlarged. Therefore, by enlarging the low line pressure region when the temperature TATF of the hydraulic oil is low temperature, it is possible to reduce friction torque of the whole transmission gear mechanism 3 in a driving state of the enlarged region. Therefore, it is possible to improve fuel economy (gasoline mileage) of the vehicle.

Further, in the first embodiment described above, the region changing section 102 includes: the determining section 103 for determining whether the mapped data are shifted in the direction in which the low line pressure region is enlarged or not; and the state determining section 104 for determining whether the throttle valve opening degree TH of the vehicle is totally closed or not, or whether the line pressure P is set to the low line pressure currently or not. In the case where the determining section 103 determines that the low line pressure region is shifted in the enlarged direction and the state determining section 104 determines that the throttle valve opening degree TH is totally closed or the line pressure P is set to the low line pressure currently, the region changing section 102 permits the change in the enlarged direction of the low line pressure region, or prohibits the change otherwise. Therefore, while improving fuel economy (gasoline mileage) of the vehicle, it is possible to effectively prevent a clutch from slipping that may occur due to a difference between the torque capacity of the engine 1 and the torque capacity of the clutch (frictional engagement element) when the line pressure P is switched from the high line pressure to the low line pressure.

Moreover, in such a configuration, in the case where the determining section 103 determines that the low line pressure region is shifted in a direction to be reduced, the region changing section 102 permits the change without carrying out the determination by the state determining section 104. For this reason, the low line pressure region in the mapped data can be changed so as to be enlarged while reducing a processing load of the electronic control unit 10 when there is no worry about slipping of the clutch.

Further, according to the line pressure control device for the automatic transmission of the second embodiment of the present invention, the switching section 102 of the electronic control unit 10 appropriately switches a plurality of mapped data stored in the storage section 101 on the basis of the temperature TATF of the hydraulic oil detected by the ATF temperature sensor 18. Therefore, by switching the low line pressure region to the enlarged mapped data when the temperature TATF of the hydraulic oil is low temperature, it is possible to reduce the friction torque of the whole transmission gear mechanism 3. For this reason, it is possible to improve fuel economy (gasoline mileage) of the vehicle.

Further, in the second embodiment described above, the switching section 102 includes: the determining section 103 for determining whether the mapped data are shifted in the direction in which the low line pressure region is enlarged or not; and the state determining section 104 for respectively determining whether the throttle valve opening degree TH of the vehicle is totally closed or not and whether the line pressure P is set to the low line pressure currently or not, wherein, in the case where the determining section 103 determines that the low line pressure region is shifted in the enlarged direction and the state determining section 104 determines that the throttle valve opening degree TH is totally closed or the line pressure P is set to the low line pressure currently, the switching section 102 permits switching of the mapped data or prohibits the switching otherwise. Therefore, while improving fuel economy (gasoline mileage) of the vehicle, it is possible to effectively prevent a clutch (frictional engagement element) from slipping that may occur due to a difference between the torque capacity of the engine 1 and the torque capacity of the clutch by switching the line pressure P from the high line pressure to the low line pressure at switching of the mapped data.

As described above, although the embodiments of the line pressure control device for the automatic transmission according to the present invention have been explained in detail on the basis of the appending drawings, the present invention is not limited to these configurations. Various modifications can be made in a scope of the technical idea described in the following claims, the specification described above and the appending drawings. In this regard, even any shape, structure or function that is not described directly in the specification and the drawings falls within the technical idea of the present invention so long as the functions and the effects of the present invention are achieved. Namely, each component constituting the line pressure control device for the automatic transmission (including the electronic control unit 10 and the hydraulic control device 6) can be replaced with any arbitrary component that can achieve the similar function to the corresponding component of the line pressure control device for the automatic transmission. Further, arbitrary components may be added to the line pressure control device for the automatic transmission.

Figure 3:
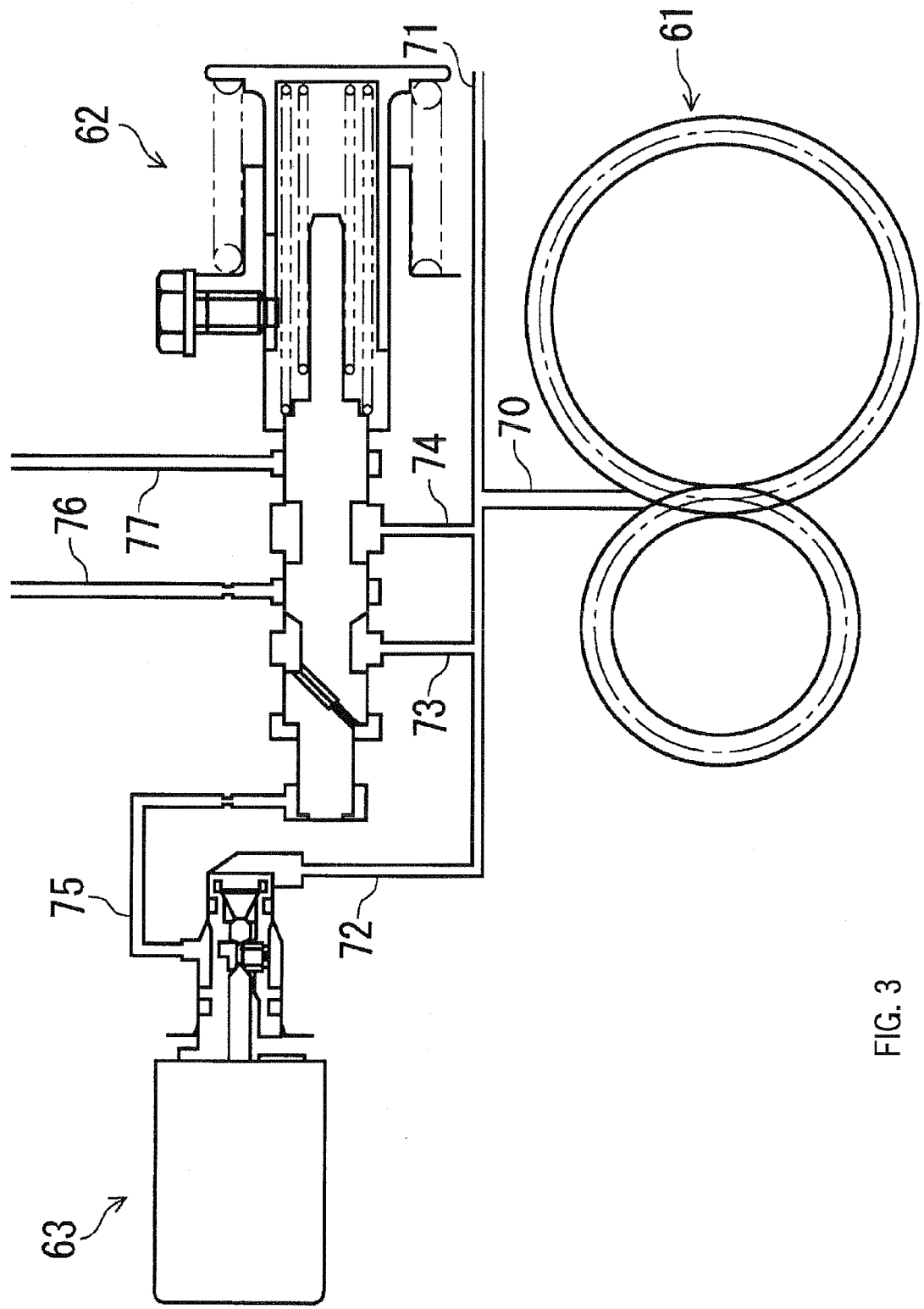
FIG. 3 is a part of an oil pressure circuit applied to the line pressure control device for the automatic transmission according to the first embodiment of the present invention.

For example, in the present invention, the oil pressure circuit of the hydraulic control device 6 is not limited to the oil pressure circuit shown in FIG. 3. So long as the line pressure P can be switched between two steps including the high line pressure and the low line pressure, it may have any configuration (including the type of valve and combination thereof).

In this regard, the case where the present invention is applied to the line pressure control device for the automatic transmission capable of switching the line pressure P between the two steps including the high line pressure and the low line pressure has been explained in the above embodiments. However, the present invention is not limited to such a line pressure control device capable of switching the line pressure P between two steps. For example, the present invention may be applied to a line pressure control device capable of switching line pressure P among three steps including $6.0 \text{ k g/cm}^2$, $7.5 \text{ kg/cm}^2$ and $9.5 \text{ kg/cm}^2$. In this case, as well as the line pressure control device switching the two steps, when the temperature TATF of the hydraulic oil detected by the ATF temperature sensor 18 is shifted to the low temperature side, the region changing section (or the switching section) 102 may change or switch hydraulic pressure control characteristics (mapped data) of the line pressure P in a direction in which the low line pressure region or a middle line pressure region is to be enlarged under a predetermined condition (the throttle valve opening degree TH is totally closed or the line pressure P is set to the low line pressure currently).

Further, in the case where it can be switched among the three steps in this manner, the determining section 103 may determine whether the hydraulic pressure control characteristics is shifted in a direction in which the middle line pressure region is to be enlarged or not. In this case, the region changing section 102 may determine whether to permit a change to the low line pressure region or the middle line pressure region in the enlarged direction or not by further considering this determination result.

What is claimed is:

1. A line pressure control device for an automatic transmission, the line pressure control device controlling a line pressure by regulating an oil pressure from an oil pressure source in the automatic transmission for a vehicle that sets up a predetermined gear by selecting and causing any of a plurality of frictional engagement elements to engage, the line pressure becoming a base pressure of hydraulic oil for controlling operations of the frictional engagement elements, the line pressure control device comprising:

a storage section for storing hydraulic pressure control characteristics for setting the line pressure to any of a high pressure region and a low pressure region on the basis of an engine load, wherein the high pressure region and low pressure region are separated by a boundary line, and the oil pressure from the oil pressure source is regulated to a given high line pressure when the line pressure is set to the high pressure region on the basis of the engine load, while the oil pressure from the oil pressure source is regulated to a given low line pressure when the line pressure is set to the low pressure region on the basis of the engine load;

a hydraulic oil temperature sensor for detecting a temperature of the hydraulic oil; and a region changing section for changing the hydraulic pressure control characteristics of the line pressure stored in the storage section on the basis of the temperature of the hydraulic oil detected by the hydraulic oil temperature sensor;

wherein the region changing section is configured to adjust the boundary line and change the hydraulic pressure control characteristics so that the low pressure region is enlarged in the changed hydraulic pressure control characteristics upon determining that the temperature of the hydraulic oil has been shifted from a predetermined high temperature range to a predetermined low temperature range, and further upon detecting that a throttle valve opening degree is totally closed or the line pressure is currently set at the given low pressure.

2. The line pressure control device for the automatic transmission as claimed in claim 1, wherein the region changing section includes:

a determining section for determining whether the temperature of the hydraulic oil has been shifted between the predetermined high temperature range and the predetermined low temperature range; and a state determining section for determining whether the throttle valve opening degree of the vehicle is totally closed or not and whether the line pressure is currently set at the given low pressure or not.

3. The line pressure control device for the automatic transmission as claimed in claim 1, wherein the region changing section is further configured to change the hydraulic pressure control characteristics so that the low pressure region is not enlarged in the changed hydraulic pressure control characteristics upon determining that the temperature of the hydraulic oil has been shifted from the predetermined low temperature range to the predetermined high temperature range.

4. A line pressure control device for an automatic transmission, the line pressure control device controlling a line pressure by regulating an oil pressure from an oil pressure source in the automatic transmission for a vehicle that sets up a predetermined gear by selecting and causing any of a plurality of frictional engagement elements to engage, the line pressure becoming a base pressure of hydraulic oil for controlling operations of the frictional engagement elements, the line pressure control device comprising:

a storage section for storing plural sets of hydraulic pressure control characteristics for the line pressure so as to respectively correspond to a plurality of temperature ranges, each of the hydraulic pressure control characteristics being configured to set the line pressure to any of a high pressure region and a low pressure region on the basis of an engine load, wherein the high pressure region and low pressure region are separated by a boundary line, and the oil pressure from the oil pressure source is regulated to a given high line pressure when the line pressure is set to the high pressure region on the basis of the engine load, while the oil pressure from the oil pressure source is regulated to a given low line pressure when the line pressure is set to the low pressure region on the basis of the engine load;

a hydraulic oil temperature sensor for detecting a temperature of the hydraulic oil; and a switching section for switching the plural sets of hydraulic pressure control characteristics of the line pressure stored in the storage section on the basis of the temperature of the hydraulic oil detected by the hydraulic oil temperature sensor, wherein the switching section is configured to adjust the boundary line so as to select particular hydraulic pressure control characteristics in which the low pressure region is enlarged upon determining that the temperature of the hydraulic oil is shifted from a high temperature side to a low temperature side of the temperature ranges, and further upon detecting that a throttle valve opening degree is totally closed or the line pressure is currently set at the given low pressure.

5. The line pressure control device for the automatic transmission as claimed in claim 4, wherein the switching section includes:
- a determining section for determining whether the temperature of the hydraulic oil is shifted from a high temperature side to a low temperature side of the plurality of temperature ranges or not; and
- a state determining section for determining whether the throttle valve opening degree of the vehicle is totally closed or not and whether the line pressure is currently set at the given low pressure or not.

* * * * *